United States Patent [19]

Fillipo

[11] Patent Number: 4,729,795
[45] Date of Patent: Mar. 8, 1988

[54] STABLE SLURRIES COMPRISING POWDERED ACTIVATED CARBON

[75] Inventor: Bruce K. Fillipo, Dublin, Pa.

[73] Assignee: Betz Laboratories, Inc., Trevose, Pa.

[21] Appl. No.: 890,687

[22] Filed: Jul. 25, 1986

Related U.S. Application Data

[63] Continuation-in-part of Ser. No. 761,641, Aug. 1, 1985, abandoned.

[51] Int. Cl.$^4$ .......................... C08L 1/26; C04B 14/36
[52] U.S. Cl. ................................ 106/193 R; 106/307
[58] Field of Search ............... 106/307, 193; 502/417, 502/437, 416

[56] References Cited

U.S. PATENT DOCUMENTS

| | | | |
|---|---|---|---|
| 1,565,328 | 12/1925 | Ray | 502/416 |
| 2,403,140 | 7/1946 | Thomsen | 502/417 |
| 3,222,180 | 12/1965 | Sucietto | 426/442 |
| 3,917,821 | 11/1975 | Manes | 424/125 |

*Primary Examiner*—Theodore Morris
*Attorney, Agent, or Firm*—Alexander D. Ricci; Bruce E. Peacock

[57] ABSTRACT

Stable, thixotropic slurries comprising wood-based powdered activated carbon and an effective amount of a polysaccharide suspending agent are disclosed. Such slurries are useful as water clarification and coagulation aids.

2 Claims, No Drawings

STABLE SLURRIES COMPRISING POWDERED ACTIVATED CARBON

CROSS REFERENCE TO RELATED APPLICATIONS

The present application is a continuation-in-part of application Ser. No. 761,641, filed Aug. 1, 1985, now abandoned.

FIELD OF THE INVENTION

The present invention pertains to stable slurry compositions comprising specific powdered activated carbons derived from a wood precursor.

BACKGROUND

The use of powdered activated carbon (P.A.C.) as a filter medium in water clarification and coagulation applications is well known. For instance, in Rice et al, U.S. Pat. No. 3,252,899, powdered activated carbon is added to the water to be clarified and is passed through a separation bed. The activated carbon particles are retained in the separation bed and provide an increased surface area upon which organic materials may be adsorbed.

Similarly, "Measurement of Trihalomethane and Precursor Concentration Changes," Stevens et al, Journal AWWA, pages 546–54, October, 1977, reports that trihalomethane removal efficiency may vary widely with time in service of granular activated carbon filters.

In U.S. Pat. No. 3,917,821 (Manes), activated carbons are combined with thickening agents such as sodium carboxymethyl cellulose, dextrans, xanthans, guar gums, etc. to form anecdotal compositions and methods. However, the particular activated carbons disclosed by Manes include Pittsburgh activated carbons which are derived from coal precursors or Nuchar carbons which are derived or based on paper by-products. The disclosure indicates that the Pittsburgh type coal-based activated carbons are preferred (col. 3, lines 13–18).

In contrast to the Manes disclosure, the powdered activated carbons which are herein used in the claimed compositions are derived from wood. That is, these particular wood-based carbons of the present invention are made by the destructive distillation of wood. As is known in the art, these wood-based carbons are prepared by driving off the volatile constituents from the wood precursor and then oxidizing the residue. Comparative stability studies have shown that a wood-based powdered carbon exhibits superior stability in comparison with the tested coal based activated carbons.

Other prior art materials which disclose varying uses of powdered activated carbon include U.S. Pat. No. 4,043,904 (Takeda et al); U.S. Pat. No. 4,239,865 (Tarao et al); U.S. Pat. No. 4,320,011 (Sato et al); Chem Abstract 87: 90304e (1977); Chem Abstract 89: 117244m (1978); Chem Abstract 94: 157877e (1981); and Chem Abstract 89: 117260p (1978). Of further possible interest is "Industrial Gums Polysaccharides and Their Derivatives", Second Edition, Whistler, Academic Press 1973, pp. 658–659.

Although the use of powdered activated carbon is well known in the art, numerous problems have arisen when the product has been shipped in dry, particulate form. Dusting problems can occur at usage locations due to the propensity of the P.A.C. to rapidly form airborne particulates. As such, potential health concerns are raised.

Additionally, in those situations in which the end-user must prepare a P.A.C. containing slurry prior to its use, a large holding vessel is needed in order to prepare the slurry.

Accordingly, there is a need in the art to provide a P.A.C. containing slurry product which can be shipped and even stored for reasonable time periods without substantial gellation or phase separation. Of especial importance is the need for such a slurry product which can easily be handled and directly pumped from its container to the desired end-use location.

DESCRIPTION OF THE INVENTION

I have found that P.A.C. can be effectively slurried with water soluble polysaccharide materials such as dextran polymers, and cellulose ethers including hydroxyalkyl ($C_1$–$C_4$) cellulose and carboxyloweralkyl ($C_1$–$C_4$) ethers.

The slurries are formulated so as to have initial viscosities within the range of about 200–4,000 CPS Brookfield RVT. The slurries of the invention are capable of withstanding long storage periods (i.e. 6 months at ambient temperatures) without undergoing significant phase separation or gellation and they exhibit thixotropy in that after such lengthy storage periods, application of shear forces reduces the viscosity of the initially prepared range, thus providing for easy pumpability of product even after storage.

Slurry formulations in accordance with the invention allow for the provision of high powdered activated carbon content in the slurry. Typical slurry formulations of the invention are within the following ranges:
Based upon total slurry weight:
polysaccharide: 0.025–5 wt %
P.A.C.: 1–50 wt %
Remainder water The cellulose ether materials may be further defined as being carboxyloweralkyl ($C_1$–$C_4$) cellulose materials or water soluble salt forms thereof. These materials are water soluble and are commercially available from Hercules, Inc. Wilmington, Del. Presently, sodium carboxymethyl cellulose is preferred for use. Hydroxyethyl cellulose also demonstrates superior efficacy.

At present the slurry preferred for use is:
0.5%—sodium carboxymethyl cellulose, having a viscosity of about 400–800 cps at 2% concentration (commercially available from Hercules, Inc.)
30%—P.A.C. (Darco KB—wood-based P.A.C. available American Norit Co. Inc.)
Remainder water Dextran polysaccharide polymers may also be mentioned as showing some, albeit minimal, efficacy although use of the above noted cellulose ether materials is clearly preferable.

Quite surprisingly, when well known suspending agents such as polyoxyalkylglycol, polyvinylalcohol and certain polyethylene glycol esters were slurried with P.A.C., unacceptable gellation or phase separation occurred within hours.

EXAMPLES

The following two procedures were undertaken to ascertain whether candidate suspending agent materials were suitable to form stable, thixotropic powdered activated carbon containing slurries.

1. Blend Viscosity—a thixotropic blend nature is necessary to help maintain blend stability (Stoke's Law). Viscosity building (or rebuilding) must be slow (minimum of several hours) to ensure easy handling and manufacturing. Final standing appearance should be fluid (not gelled) and viscosity reduction (recovery) must occur with shear.

2. Stability—all samples are subjected to static 40° F., ambient, and 122° F. stability testing. Blend gellation, hard pack sludging or significant liquid separation following six week ambient and 40° F. and one week storage at 122° F. will necessitate candidate suspending agent rejection. Dispersion viscosity recovery upon the application of moderate shear is required following three week 122° F. storage.

Based upon the above test procedures, the following polysaccharide suspending agents were deemed to pass:

1. dextran polymer—only minimal efficacy, some trouble in attaining the desired P.A.C. level in the resulting slurry.
2. sodium carboxymethyl cellulose, Hercules, Inc., 9M8F, viscosity at 2% concentration, 400-800 cps at 25° C.—presently preferred for use.
3. hydroxyethyl cellulose, Hercules, Inc., Natrosol—only minimal efficacy, due to some sludging with storage.

The following well known dispersants failed the above tests and hence are deemed not suitable:

1. Westvaco POE-40, polyoxyethylene sorbitolhexaoleate.
2. Westvaco PEG-600 DOTS, polyethyleneglycoldioleate.
3. Westvaco PEG-400 MOT, polyethyleneglycolmonoleate.
4. Polyvinylalcohol, high viscosity "Elvanol HV."
5. Polyvinylalcohol, low molecular weight "9050 Elvanol."
6. "U-Con 5100," polyalkylene glycol.

Slurries of P.A.C. with effective polysaccharide suspending agents have proven useful in influent water clarification methods.

In order to demonstrate the importance of the use of the specific wood-based powdered activated carbon component, blend viscosity and stability tests, as reported supra. were undertaken with Darco KB wood-based powdered activated carbon, and various lignite (coal)-based powered activated carbons.

The test powdered activated carbons were:

1. Darco KB—American Norit Company, Inc.; wood-based powdered activated carbon. This is a powdered activated carbon of exceptionally high adsorptive capacity for specific color bodies and other impurities, and is often used for purifying liquids having high color.

| General Characteristics | |
| --- | --- |
| pH, water extract | Approx. 5 |
| Bulk density, tamped, lbs/ft$^3$ | Approx. 28 |
| Mesh size, | |
| % thru 100 mesh | Approx. 99 |
| % thru 325 mesh | Approx. 70 |
| Phosphates, extractable % | Approx. 0.5 |
| Ash, % | Approx. 3 |
| Total surface area, dry basis, m$^2$/g | Approx. 1500 |
| Total pore volume, dry basis, mL/g | Approx. 2 |
| Specifications | |
| Molasses decolorizing efficiency | 185 min. |
| Moisture, % as packed | 33.0 max. |
| Water solubles, % | 1.5 max. |

2. Darco S-51—lignite-based carbon. This is a low-priced activated carbon having exceptionally high efficiency, good filterability, and above average purity. It is particularly well-suited for the majority of purification applications.

| General Characteristics | |
| --- | --- |
| pH (water extract) | Approx. 5.0 |
| Bulk density, tamped (lbs/ft$^3$) | Approx. 32 |
| Mesh size, | |
| % thru 100 | Approx. 98 |
| % thru 325 | Approx. 70 |
| Total surface area, dry basis (m$^2$/g) | Approx. 650 |
| Surface area between 20Å–250Å, dry basis (m$^2$/g) | Approx. 142 |
| Total pore volume, dry basis (mL/g) | Approx. 1.0 |
| Pore volume between 20Å–250Å, dry basis (mL/g) | Approx. 0.36 |
| Storage space (ft$^3$/ton) | Approx. 80 |
| Specifications | |
| Decolorizing efficiency (molasses solution) RE | 95 min. |
| Filterability (water), SEC/ML/CM | 1.0 max. |
| Moisture, % as packed | 10.0 max. |
| Water solubles, % | 1.5 max. |

3. Darco GFP—Darco GFP powdered activated carbon is a high adsorptive capacity lignite-based activated carbon designed for mineral process applications. Most of Darco GFP's surface area is in the range suitable for adsorption of flotation reagents and metallic ions. To ensure good dispersion in ore pulps and concentrates, Darco GFP is ground to a minimum of 95%–325 mesh.

| General Characteristics | |
| --- | --- |
| pH (water extract) | Alkaline |
| Bulk density, tamped (lbs/ft$^3$) | Approx. 30 |
| Total surface area, dry basis (m$^2$/g) | Approx. 600 |
| Total pore volume, dry basis (mL/g) | Approx. 0.95 |
| Storage space (ft$^3$/ton) | Approx. 80 |
| Specifications | |
| Moisture, % as packed | 8.0 max. |
| Mesh size, % thru 325 | 95.0 min. |

4. Hydrodarco—American Norit Company, Inc., lignite-based carbon. This is a specialty activated carbon with a high capacity for adsorption of organics causing taste and odor problems in water supplies. This product is finely ground to obtain a high degree of suspendability in water.

Hydrodarco B is the most effective water treatment carbon available for the removal of tannins and humic acid, which are precursors of chloroform and other volatile organics, all of which are the principal causes of taste and odor in municipal drinking water. Tannins and humic acids are formed by decaying matter such as tree stumps and peat moss and are prevalent in most water supplies.

Hydrodarco B is also highly effective in P.C.B. (Polychlorinated Biphenyls) removal.

| | Typical Values | AWWA B-600-78 Specifications |
| --- | --- | --- |
| Iodine No. | 580 | 500 (min.) |
| Modified Phenol Value | 28 MPV (3.2 g/l) | 30 max. MPV (3.5 g/l) |
| Tannin Value | 350 | Tannin not more than 10% greater than refer- |

|  | Typical Values | AWWA B-600-78 Specifications |
|---|---|---|
| Odor Adsorption Capacity | Reference sample furnished | Taste and odor reduction not less than 70% of reference sample |
| Moisture, % as packed | 4% | 8% max. |
| Apparent Density, g/mL | 0.5 g/mL | 0.2–0.75 g/mL |
| Particle Size Dist. | | |
| % thru 100 mesh | 99 | 99 min. |
| % thru 200 mesh | 95 | 95 min. |
| % thru 325 mesh | 90 | 90 min. |

PROCEDURES AND RESULTS

Testing in accordance with the Blend Viscosity and Stability procedures supra was based on:
1. Blending properties—
   a. rate of viscosity increase
   b. final concentration of carbon (25% optimum)
   c. handling characteristics
   d. final blend viscosity
2. Final blend stability at 40° F., ambient and 122° F.—
   a. viscosity change
   b. sludging
   c. liquid separation All tested carbons exhibited acceptable blending properties; however, Darco KB showed superior stability. When blended into a product containing 0.5% sodium carboxymethyl cellulose, 30% P.A.C., remainder water, Darco KB showed only slight stratification without liquid separation or hard pack sludging following six week stability testing at ambient or 40° F. and one week at 122° F. Liquid separation and some sludging were observed in samples prepared with Darco GFP, Darco S-51 and Hydrodarco B after one day at ambient.

Based upon our limited testing to date, Darco KB offers unique activated carbon dispersion stability.

Optional Use of Clay Materials to Enhance Stability of the Slurry

In yet another embodiment of the invention, preliminary tests have indicated that the stability of the P.A.C. slurries is even further enhanced by the addition of clay to the slurry so that the resulting compositions are:

% by weight:
P.A.C.: 1–50%
Polysaccharide: 0.025–5%
Clay: 0.025–5%
Remainder water The term "clay" may be defined as a "naturally occurring sediment (including that obtained by alteration in situ by supergene and hydrothermal processes) or sedimentary rock composed of one or more minerals and accessory compounds, the whole usually being rich in hydrated silicates of aluminum, iron or magnesium, hydrated alumina, or iron oxide, predominating in particles of colloidal or near-colloidal size, and commonly developing plasticity when sufficiently pulverized and wetted." Kirk-Othmer, *Encyclopedia of Chemical Technology*, Volume 5, page 544 (2nd edition), John Wiley and Sons, Inc., New York, NY 1964.

The "montmorillonite" clays refer generically to crystalline clays having three layers. These clays are composed of units having two layers of silica tetrahedrons and one centrally disposed dioctahedral or trioctahedral layer. Such montmorillonite clays may be classified as either having an expanding lattice structure or a nonexpanding lattice. *The Encyclopedia of Chemistry* (third edition), Van Nostrand Reinhold Co., New York, 1973.

The term "montmorillonite" has also been used to specify a species member of the "montmorillonite" genus; i.e., an aluminous member of the group accorded the empirical formula

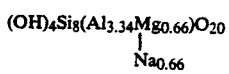

$$(OH)_4Si_8(Al_{3.34}Mg_{0.66})O_{20}$$
$$|$$
$$Na_{0.66}$$

Both bentonite and hectorite are members of the expanding lattice montmorillonite subgenus. One difference between the two is that in hectorite, the aluminum present in the bentonite lattice is almost completely substituted by magnesium atoms. Another difference is that lithium and fluorine are absent from the bentonite lattice and present in the hectorite lattice. Bentonite may be characterized as a sodium aluminum silicate, with hectorite being a sodium magnesium-fluor-litho silicate.

In those situations in which it is desirable to add clay to the slurry, use of hectorite clay is then preferred. Hectorite has been given the empirical formula

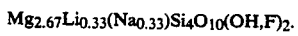

$$Mg_{2.67}Li_{0.33}(Na_{0.33})Si_4O_{10}(OH,F)_2.$$

One hectorite which may be used in accordance with the invention is Capricorn H, Capricorn Chemicals. It has been reported to have the following analysis:

| Capricorn H HECTORITE | |
|---|---|
| Shape | Elongate |
| Particle Size (dispersed) | 0.8 × 0.89 × 0.0010 microns |
| Type | Trioctahedral |
| Color | White to Light Pink |
| Composition | |
| Clay | 50.0% |
| Water | 6.1 |
| Quartz | 1.0 |
| Cristobalite | — |
| Calcite | 30.0 |
| Dolomite | 12.9 |
| Feldspar | — |
| Gypsum | — |
| Illite | — |
| | 100.0% |
| Oxide Analyses | |
| $SiO_2$ | 55.86% |
| $Al_2O_3$ | 0.13 |
| $Fe_2O_3$ | 0.03 |
| FeO | — |
| MnO | None |
| MgO | 25.03 |
| CaO | Tr |
| $K_2O$ | 0.10 |
| $Na_2O$ | 2.68 |
| $Li_2O$ | 1.05 |
| $TiO_2$ | None |
| $CO_2$ | — |
| F | 5.96 |
| $H_2O-$ | 9.90 |
| $H_2O+$ | 2.24 |
| | 102.98% |

Other commercially available hectorite clays which may be used in accordance with the invention include "Hectorite Clay", a natural hectorite available from NL Industries; "Macoloid", a purified hectorite available from NL Industries and "Bentone EW", a beneficiated hectorite available from NL Industries.

By "natural" hectorite, we mean hectorite as it is mined. Typically, such "natural" hectorite may comprise from around 40-60% hectorite and 40-60% other minerals.

Use of the phrase purified hectorite in the disclosure and claims signifies a hectorite which, via processing, has had all or most of the non-clay components removed. This includes those hectorites which have been subjected to a drying step.

The phrase beneficiated hectorite is used herein to define hectorites that have been treated with or chemically reacted with organic or other chemical treatments.

Of course, those skilled in the art may be capable of developing a purely synthetic hectorite. Such synthetic hectorites also fall within the ambit of the invention.

One present composition which will provide requisite viscosity and stability is:

Darco KB P.A.C.: 25%
CMC (carboxymethyl cellulose): 0.5%
Hectorite Clay: 0.25%
Remainder Water In accordance with the patent statutes, the best mode of practicing the invention has been herein set forth. However, it will be apparent to those skilled in the art that many modifications can be made in the compositions herein disclosed without departing from the spirit of the invention. It is to be understood that the scope of the invention is to be understood that the scope of the invention is to be limited solely by the scope of the appended claims:

I claim:

1. Slurry composition comprising powdered activated carbon prepared by the destructive distillation of a wood precursor, sodium carboxymethylcellulose, and hectorite clay, wherein, based on the total weight of said slurry, said powdered activated carbon being present in an amount of from about 1% to about 50 wt %, said sodium carboxymethylcellulose being present in an amount of from about 0.25% to about 5 wt %, and said hectorite clay being present in an amount of from about 0.25% to about 5 wt %.

2. Composition as recited in claim 1 wherein said powdered activated carbon is present in an amount of about 25 wt %, said sodium carboxymethylcellulose being present in an amount of about 0.5 wt % and said hectorite being present in an amount of about 0.25%.

* * * * *